(12) United States Patent
Lu et al.

(10) Patent No.: US 11,640,261 B2
(45) Date of Patent: May 2, 2023

(54) LOG PROCESSING METHOD TO AVOID LOG COLLISION, AND RELATED DEVICE AND SYSTEM

(71) Applicant: HUAWEI TECHNOLOGIES CO., LTD., Shenzhen (CN)

(72) Inventors: Yuanfei Lu, Shenzhen (CN); Feng Liang, Shenzhen (CN); Cunwei Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 273 days.

(21) Appl. No.: 16/890,965

(22) Filed: Jun. 2, 2020

(65) Prior Publication Data
US 2020/0293220 A1    Sep. 17, 2020

Related U.S. Application Data

(63) Continuation of application No. PCT/CN2018/119387, filed on Dec. 5, 2018.

(30) Foreign Application Priority Data

Dec. 5, 2017 (CN) .......................... 201711272235.6

(51) Int. Cl.
 *G06F 3/06* (2006.01)
 *G06F 16/23* (2019.01)
(52) U.S. Cl.
 CPC .......... *G06F 3/0655* (2013.01); *G06F 3/0604* (2013.01); *G06F 3/0683* (2013.01); *G06F 16/2358* (2019.01)
(58) Field of Classification Search
 CPC ..................... G06F 3/0604; G06F 16/2358
 See application file for complete search history.

(56) References Cited

U.S. PATENT DOCUMENTS 7,165,174 B1    1/2007 Ginter et al.
9,280,591 B1    3/2016 Kharatishvili et al.
(Continued)

FOREIGN PATENT DOCUMENTS

CN    102724063 A    10/2012
CN    105227657 A    1/2016
(Continued)

OTHER PUBLICATIONS

Jay Kreps:"The Log: What every software engineer should know about real-time data"'s unifying abstraction", Dec. 16, 2013, Retrieved from the internet:https://engineering.linkedin.com/distributed-systems/log-what-every-software-engineer-should-know-about-real-time-datas-unifying?spm=5176.100239.0.0.IOsDQR, total 27 pages.

*Primary Examiner* — David Yi
*Assistant Examiner* — Nicholas A. Paperno
(74) *Attorney, Agent, or Firm* — Paul Christopher Hashim

(57) ABSTRACT

Log processing provides a status message of a storage node cluster is obtained by a first node. The status message marks a master storage node of the storage node cluster. The first node can send a first write operation request to the master storage node based on the status message so that the master storage node agrees on a first write operation after agreeing on a received log with a slave storage node in the storage node cluster. The first node receives a feedback message sent after the master storage node agrees on the first write operation with the slave storage node in the storage node cluster. The feedback message includes identification information and a response to the first write operation request. The first node can send to the master storage node a target message including a current iteration identifier, and the master storage node can use the current iteration identifier to determine whether the target message is from a latest master compute node.

17 Claims, 6 Drawing Sheets

(56) References Cited

U.S. PATENT DOCUMENTS

| | | | | |
|---|---|---|---|---|
| 9,984,140 B1* | 5/2018 | Sukumaran | ............ | G06F 16/27 |
| 2012/0166407 A1* | 6/2012 | Lee | ........................ | G06F 9/466 |
| | | | | 707/703 |
| 2014/0101106 A1 | 4/2014 | Lee et al. | | |
| 2014/0122429 A1* | 5/2014 | Chen | .................... | G06F 16/182 |
| | | | | 707/623 |
| 2018/0253468 A1* | 9/2018 | Gurajada | ................ | G06F 16/22 |

FOREIGN PATENT DOCUMENTS

| | | | |
|---|---|---|---|
| CN | 106709069 A | | 5/2017 |
| CN | 107330035 A | | 11/2017 |
| CN | 107426265 A | | 12/2017 |
| WO | 2000072532 A1 | | 11/2000 |

\* cited by examiner

LOG PROCESSING METHOD TO AVOID LOG COLLISION, AND RELATED DEVICE AND SYSTEM

CROSS-REFERENCE TO RELATED APPLICATIONS

This application is a continuation of International Application No. PCT/CN2018/119387, filed on Dec. 5, 2018, which claims priority to Chinese Patent Application No. 201711272235.6, filed on Dec. 5, 2017. The disclosures of the aforementioned applications are hereby incorporated by reference in their entireties.

TECHNICAL FIELD

Aspects of the present invention relate to the field of computer technologies, and in particular, to a log processing method, and a related device and system.

BACKGROUND

In a database, data modification records are usually stored in logs. The log-related processes include: generation and storage. The log generation is usually implemented by compute nodes, and the log storage is usually implemented by storage nodes. To ensure security and stability of the log, both the compute nodes and the storage nodes are deployed in a distributed manner. As shown in FIG. 1, a plurality of compute nodes form a compute node cluster. The compute node cluster includes a master compute node (primary) and at least one slave compute node (slave). The master compute node can receive a data read operation and a data write operation that are sent by a client, and the write operation generates a log. The slave compute node can receive a data read operation sent by the client. In FIG. 1, a plurality of storage nodes form a storage node cluster. The storage node cluster includes one master storage node (leader) and at least one slave storage node (follower). The master storage node, the slave storage node, and the master compute node keep consistency on records of a same log. However, consistency cannot be ensured in some scenarios. For example, it is assumed that the master compute node sends logs whose log sequence numbers (log sequence number, LSN) are 1, 2, and 3 to the master storage node. When the master storage node and most slave storage nodes in the storage node cluster agree on the logs whose LSNs are 1 and 2, but do not agree on the log whose LSN is 3, if the master compute node becomes faulty and a new master compute node is selected from the compute node cluster, the master storage node sends the log sequence number 2 to the new master compute node, to indicate that the log represented by 1 and the log represented by 2 have been agreed on. Subsequently, when the master compute node sends another log to the master storage node, the master storage node numbers the log from LSN 3. In this way, the master storage node receives a log whose LSN is 3 again. Actually, the two received logs whose LSNs are 3 are not a same log. If the master storage node completes consensus processing on the two logs whose LSNs are 3, a collision occurs in the logs stored in the storage node cluster.

How to avoid a log storage collision is a technical problem that is being researched by a person skilled in the art.

SUMMARY

Embodiments of the present invention disclose a log processing method, and a related device and system, to avoid a log collision.

A first aspect of the embodiments of the present invention discloses a log processing method. The method includes: first, obtaining, by a first node during initialization, a status message of a storage node cluster, where the status message marks a master storage node of the storage node cluster; and the first node is a master compute node that has a write operation capability and a read operation capability in a compute node cluster; then, sending, by the first node, a first write operation request to the master storage node based on the status message, so that the master storage node agrees on a first write operation after agreeing on a received log with a slave storage node in the storage node cluster; and then, receiving, by the first node, a feedback message that is sent after the master storage node agrees on the first write operation with the slave storage node in the storage node cluster, where the feedback message includes identification information and a response to the first write operation request, and the identification information is used to indicate the agreed log.

By performing the foregoing steps, the first node sends, during initialization, the first write operation request to the master storage node, and then the master storage node agrees on the first write operation after agreeing on the received log with the slave storage node. In this way, when subsequently feeding back a submitted log to the first node, the master storage node does not miss any received log, so that the first node and the master storage node keep consistency on a recorded LSN, and a log collision problem caused by inconsistent LSNs is avoided.

With reference to the first aspect, in a first possible implementation of the first aspect, after the receiving, by the first node, a feedback message that is sent after the master storage node agrees on the first write operation with the slave storage node in the storage node cluster, the method further includes: sending, by the first node, a target message to the master storage node, where the target message includes a current iteration identifier, and the current iteration identifier is used by the master storage node to determine whether the target message is from a latest master compute node; and the current iteration identifier is greater than a previous iteration identifier sent by a previous master compute node. To be specific, master compute nodes in different periods are marked by using different iteration identifiers, and the iteration identifiers are added to target messages to be sent. In this way, the master storage node can determine, by using the iteration identifier in the target message, whether the target message is a target message sent by the latest master compute node, and therefore can determine whether to discard the target message.

With reference to any one of the first aspect or the foregoing possible implementation of the first aspect, in a second possible implementation of the first aspect, before the sending, by the first node, a target message to the master storage node, the method further includes: first, sending, by the first node, a first request to a preset configuration manager, to request the current iteration identifier, where the configuration manager is a preconfigured node configured to maintain information required by the master compute node and information required by the master storage node; and then, receiving, by the first node, the current iteration identifier sent by the configuration manager. To be specific, the iteration identifier is independently stored by the configuration manager and may be queried for by any node that may become the master compute node in the compute node cluster, instead of being stored in each node in the compute node cluster. This can avoid an iteration identifier collision caused by inconsistent iteration identifiers maintained by the nodes in the compute node cluster.

With reference to any one of the first aspect or the foregoing possible implementations of the first aspect, in a third possible implementation of the first aspect, before the sending, by the first node, a target message to the master storage node, the method further includes: first, sending, by the first node, a first request to a preset configuration manager, to request the previous iteration identifier, where the configuration manager is a preconfigured node configured to maintain information required by the master compute node and information required by the master storage node; then, receiving, by the first node, the previous iteration identifier sent by the configuration manager; and then, generating, by the first node, the current iteration identifier based on the previous iteration identifier. To be specific, the iteration identifier is independently stored by the configuration manager and may be queried for by any node that may become the master compute node in the compute node cluster, instead of being stored in each node in the compute node cluster. This can avoid an iteration identifier collision caused by inconsistent iteration identifiers maintained by the nodes in the compute node cluster.

With reference to any one of the first aspect or the foregoing possible implementations of the first aspect, in a fourth possible implementation of the first aspect, the target message includes at least one log; and the sending, by the first node, a target message to the master storage node includes: asynchronously sending, by the first node, M target messages to the master storage node by using N slots, where each slot in the N slots is used to send one target message each time, and a target message including a log with an earlier generation time is sent earlier; and in any two target messages that are sent close to each other, a latter target message is sent only after a former sent target message is received by the master storage node, a generation time of any log in the latter sent target message is later than a generation time of any log in the former sent target message, and M and N each is an integer greater than or equal to 2. It may be understood that, when a plurality of slots are used to asynchronously send the target messages, when one slot completes sending the target message but is still waiting for the master storage node to feed back a processing result of the target message, another slot can start to send another target message. This is different from the prior art in which the another target message is sent only after the master storage node feeds back the result. Therefore, in this embodiment of the present invention, a time for waiting for the master storage node to feed back the result is fully used, and a time span for sending the target messages is shortened. This improves sending efficiency.

With reference to any one of the first aspect or the foregoing possible implementations of the first aspect, in a fifth possible implementation of the first aspect, the obtaining, by a first node during initialization, a status message of a storage node cluster includes: obtaining, by the first node during initialization, the status message of the storage node cluster from the configuration manager, where the configuration manager is the preconfigured node configured to maintain the information required by the master compute node and the information required by the master storage node. To be specific, the status message is independently stored by the configuration manager and may be queried for by any node that may become the master compute node in the compute node cluster, instead of being stored in each node in the compute node cluster. This can avoid a status message collision caused by inconsistent status messages maintained by the nodes in the compute node cluster.

According to a second aspect, an embodiment of the present invention provides a log processing method. The method includes: first, receiving, by a master storage node, a first write operation request sent by a first node, where the first node is a master compute node that has a write operation capability and a read operation capability in a compute node cluster; then, agreeing, by the master storage node based on the first write operation request, on a first write operation after agreeing on a received log with a slave storage node in a storage node cluster in which the master storage node is located; and then, sending, by the master storage node to the first node, identification information and a response to the first write operation request after agreeing on the first write operation with the slave storage node, where the identification information is used to indicate the agreed log.

By performing the foregoing steps, the first node sends, during initialization, the first write operation request to the master storage node, and then the master storage node agrees on the first write operation after agreeing on the received log with the slave storage node. In this way, when subsequently feeding back a submitted log to the first node, the master storage node does not miss any received log, so that the first node and the master storage node keep consistency on a recorded LSN, and a log collision problem caused by inconsistent LSNs is avoided.

With reference to the second aspect, in a first possible implementation of the second aspect, after the sending, to the first node, an LSN of the agreed log and a response to the first write operation request, the method further includes: first, receiving, by the master storage node, a target message, where the target message includes a current iteration identifier and at least one log; and then, if the current iteration identifier is smaller than an iteration identifier stored in the master storage node, discarding, by the master storage node, the log in the currently received target message, where the iteration identifier stored in the master storage node is a previous iteration identifier received by the master storage node. To be specific, master compute nodes in different periods are marked by using different iteration identifiers, and the iteration identifiers are added to the target messages to be sent. In this way, the master storage node can determine, by using the iteration identifier in the target message, whether the target message is a target message sent by a latest master compute node, and therefore can determine whether to discard the target message.

With reference to any one of the second aspect or the foregoing possible implementation of the second aspect, in a second possible implementation of the second aspect, the method further includes: if the current iteration identifier is not smaller than the iteration identifier stored in the master storage node, synchronizing, by the master storage node, the log in the currently received target message to the storage node cluster in which the master storage node is located; and replacing the iteration identifier stored in the master storage node with the current iteration identifier.

With reference to any one of the second aspect or the foregoing possible implementations of the second aspect, in a third possible implementation of the second aspect, the receiving, by the master storage node, a target message includes: receiving, by the master storage node, M target messages that are asynchronously sent by the first node by using N slots, where each slot in the N slots is used to send one target message each time, and a target message including a log with an earlier generation time is sent earlier; and in any two target messages that are sent close to each other, a latter target message is sent only after a former sent target message is received by the master storage node, a generation time of any log in the latter sent target message is later than a generation time of any log in the former sent target message, and M and N each is an integer greater than or equal to 2. It may be understood that, when a plurality of slots are used to asynchronously send the target messages, when one slot completes sending the target message but is still waiting for the master storage node to feed back a processing result of the target message, another slot can start to send another target message. This is different from the prior art in which the another target message is sent only after the master storage node feeds back the result. Therefore, in this embodiment of the present invention, a time for waiting for the master storage node to feed back the result is fully used, and a time span for sending the target messages is shortened. This improves sending efficiency.

With reference to any one of the first aspect, the foregoing possible implementations of the first aspect, the second aspect, or the foregoing possible implementations of the second aspect, in an optional solution, the first node is a new master compute node that has the write operation capability and the read operation capability in the compute node cluster. The new master compute node that has the write operation capability and the read operation capability usually does not know whether the previous master compute node sends a log, and therefore does not know an LSN of the log that has been received by the master storage node. In this case, the latest master compute node sends the first write operation request to the master storage node, to trigger the master storage node to agree on the received log with the slave storage node and feed back the log to the latest master compute node, so that the latest master compute node knows the LSN of the log that has been received by the master storage node. Subsequently, when the latest master compute node sends a log to the master storage node, a case in which different logs have a same LSN does not occur. This avoids a log collision.

According to a third aspect, an embodiment of the present invention provides a log. The log includes a processor, a memory, and a communications interface. The memory is configured to store a program instruction, and the processor is configured to invoke the program instruction to perform the following operations: first, obtaining, during initialization, a status message of a storage node cluster, where the status message marks a master storage node of the storage node cluster; and the node is a master compute node that has a write operation capability and a read operation capability in a compute node cluster; then, sending, by using the communications interface, a first write operation request to the master storage node based on the status message, so that the master storage node agrees on a first write operation after agreeing on a received log with a slave storage node in the storage node cluster; and then, receiving, by using the communications interface, a feedback message that is sent after the master storage node agrees on the first write operation with the slave storage node in the storage node cluster, where the feedback message includes identification information and a response to the first write operation request, and the identification information is used to indicate the agreed log.

By performing the foregoing operations, the node sends, during initialization, the first write operation request to the master storage node, and then the master storage node agrees on the first write operation after agreeing on the received log with the slave storage node. In this way, when subsequently feeding back a submitted log to the node, the master storage node does not miss any received log, so that the node and the master storage node keep consistency on a recorded LSN, and a log collision problem caused by inconsistent LSNs is avoided.

With reference to the third aspect, in a first possible implementation of the third aspect, after the receiving, by using the communications interface, a feedback message that is sent after the master storage node agrees on the first write operation with the slave storage node in the storage node cluster, the processor is further configured to: send a target message to the master storage node by using the communications interface, where the target message includes a current iteration identifier, and the current iteration identifier is used by the master storage node to determine whether the target message is from a latest master compute node; and the current iteration identifier is greater than a previous iteration identifier sent by a previous master compute node. To be specific, master compute nodes in different periods are marked by using different iteration identifiers, and the iteration identifiers are added to the target messages to be sent. In this way, the master storage node can determine, by using the iteration identifier in the target message, whether the target message is a target message sent by the latest master compute node, and therefore can determine whether to discard the target message.

With reference to any one of the third aspect or the foregoing possible implementation of the third aspect, in a second possible implementation of the third aspect, before the sending a target message to the master storage node by using the communications interface, the processor is further configured to: first, send a first request to a preset configuration manager by using the communications interface, to request the current iteration identifier, where the configuration manager is a preconfigured node configured to maintain information required by the master compute node and information required by the master storage node; and then, receive, by using the communications interface, the current iteration identifier sent by the configuration manager. To be specific, the iteration identifier is independently stored by the configuration manager and may be queried for by any node that may become the master compute node in the compute node cluster, instead of being stored in each node in the compute node cluster. This can avoid an iteration identifier collision caused by inconsistent iteration identifiers maintained by the nodes in the compute node cluster.

With reference to any one of the third aspect or the foregoing possible implementations of the third aspect, in a third possible implementation of the third aspect, before the sending a target message to the master storage node by using the communications interface, the processor is further configured to: first, send a first request to a preset configuration manager by using the communications interface, to request the previous iteration identifier, where the configuration manager is a preconfigured node configured to maintain information required by the master compute node and information required by the master storage node; then, receive, by using the communications interface, the previous iteration identifier sent by the configuration manager; and then, generate the current iteration identifier based on the previous iteration identifier. To be specific, the iteration identifier is independently stored by the configuration manager and may be queried for by any node that may become the master compute node in the compute node cluster, instead of being stored in each node in the compute node cluster. This can avoid an iteration identifier collision caused by inconsistent iteration identifiers maintained by the nodes in the compute node cluster.

With reference to any one of the third aspect or the foregoing possible implementations of the third aspect, in a fourth possible implementation of the third aspect, the target message includes at least one log; and the sending, by the processor, a target message to the master storage node by using the communications interface is specifically: asynchronously sending, by using the communications interface, M target messages to the master storage node by using N slots, where each slot in the N slots is used to send one target message each time, and a target message including a log with an earlier generation time is sent earlier; and in any two target messages that are sent close to each other, a latter target message is sent only after a former sent target message is received by the master storage node, a generation time of any log in the latter sent target message is later than a generation time of any log in the former sent target message, and M and N each is an integer greater than or equal to 2. It may be understood that, when a plurality of slots are used to asynchronously send the target messages, when one slot completes sending the target message but is still waiting for the master storage node to feed back a processing result of the target message, another slot can start to send another target message. This is different from the prior art in which the another target message is sent only after the master storage node feeds back the result. Therefore, in this embodiment of the present invention, a time for waiting for the master storage node to feed back the result is fully used, and a time span for sending the target messages is shortened. This improves sending efficiency.

With reference to any one of the third aspect or the foregoing possible implementations of the third aspect, in a fifth possible implementation of the third aspect, the obtaining, by the processor during initialization, a status message of a storage node cluster is specifically: obtaining, during initialization, the status message of the storage node cluster from the configuration manager, where the configuration manager is the preconfigured node configured to maintain the information required by the master compute node and the information required by the master storage node. To be specific, the status message is independently stored by the configuration manager and may be queried for by any node that may become the master compute node in the compute node cluster, instead of being stored in each node in the compute node cluster. This can avoid a status message collision caused by inconsistent status messages maintained by the nodes in the compute node cluster.

With reference to any one of the third aspect or the foregoing possible implementations of the third aspect, in an optional solution, the node is a new master compute node that has the write operation capability and the read operation capability in the compute node cluster. The new master compute node that has the write operation capability and the read operation capability usually does not know whether the previous master compute node sends a log, and therefore does not know an LSN of the log that has been received by the master storage node. In this case, the latest master compute node sends the first write operation request to the master storage node, to trigger the master storage node to agree on the received log with the slave storage node and feed back the log to the latest master compute node, so that the latest master compute node knows the LSN of the log that has been received by the master storage node. Subsequently, when the latest master compute node sends a log to the master storage node, a case in which different logs have a same LSN does not occur. This avoids a log collision.

According to a fourth aspect, an embodiment of the present invention provides a node. The node includes a processor, a memory, and a communications interface. The memory is configured to store a program instruction, and the processor is configured to invoke the program instruction to perform the following operations: first, receiving, by using the communications interface, a first write operation request sent by a first node, where the first node is a master compute node that has a write operation capability and a read operation capability in a compute node cluster; then, agreeing, based on the first write operation request, on a first write operation after agreeing on a received log with a slave storage node in a node cluster in which the node is located; and then, sending, to the first node by using the communications interface, identification information and a response to the first write operation request after agreeing on the first write operation with the slave storage node, where the identification information is used to indicate the agreed log.

By performing the foregoing operations, the first node sends, during initialization, the first write operation request to the node, and then the node agrees on the first write operation after agreeing on the received log with the slave storage node. In this way, when subsequently feeding back a submitted log to the first node, the node does not miss any received log, so that the first node and the node keep consistency on a recorded LSN, and a log collision problem caused by inconsistent LSNs is avoided.

With reference to the fourth aspect, in a first possible implementation of the fourth aspect, after the sending, to the first node by using the communications interface, an LSN of the agreed log and a response to the first write operation request, the processor is further configured to: first, receive a target message by using the communications interface, where the target message includes an iteration identifier and at least one log; and then, if the current iteration identifier is smaller than an iteration identifier stored in the node, discard the log in the currently received target message, where the iteration identifier stored in the node is a previous iteration identifier received by the node. To be specific, master compute nodes in different periods are marked by using different iteration identifiers, and the iteration identifiers are added to the target messages to be sent. In this way, the node can determine, by using the iteration identifier in the target message, whether the target message is a target message sent by a latest master compute node, and therefore can determine whether to discard the target message.

With reference to any one of the fourth aspect or the foregoing possible implementation of the fourth aspect, in a second possible implementation of the fourth aspect, the processor is further configured to: if the current iteration identifier is not smaller than the iteration identifier stored in the node, synchronize, by using the communications interface, the log in the currently received target message to the node cluster in which the node is located; and replace the iteration identifier stored in the node with the current iteration identifier.

With reference to any one of the fourth aspect or the foregoing possible implementations of the fourth aspect, in a third possible implementation of the fourth aspect, the receiving, by the processor, a target message by using the communications interface is specifically: receiving, by using the communications interface, M target messages that are asynchronously sent by the first node by using N slots, where each slot in the N slots is used to send one target message each time, and a target message including a log with an earlier generation time is sent earlier; and in any two target messages that are sent close to each other, a latter target message is sent only after a former sent target message is received by the node, a generation time of any log in the latter sent target message is later than a generation time of any log in the former sent target message, and M and N each is an integer greater than or equal to 2. It may be understood that, when a plurality of slots are used to asynchronously send the target messages, when one slot completes sending the target message but is still waiting for the node to feed back a processing result of the target message, another slot can start to send another target message. This is different from the prior art in which the another target message is sent only after the node feeds back the result. Therefore, in this embodiment of the present invention, a time for waiting for the node to feed back the result is fully used, and a time span for sending the target messages is shortened. This improves sending efficiency.

With reference to any one of the fourth aspect or the foregoing possible implementations of the fourth aspect, in an optional solution, the first node is a new master compute node that has the write operation capability and the read operation capability in the compute node cluster. The new master compute node that has the write operation capability and the read operation capability usually does not know whether a previous master compute node sends a log, and therefore does not know an LSN of the log that has been received by the node. In this case, the latest master compute node sends the first write operation request to the node, to trigger the node to agree on the received log with the slave storage node and feed back the log to the latest master compute node, so that the latest master compute node knows the LSN of the log that has been received by the node. Subsequently, when the latest master compute node sends a log to the node, a case in which different logs have a same LSN does not occur. This avoids a log collision.

With reference to any one of the foregoing aspects or the possible implementations of the foregoing aspects, in an optional solution, the first write operation includes a no-operation noop.

According to a fifth aspect, an embodiment of the present invention provides a log processing system. The log processing system includes a master compute node, at least one slave compute node, a master storage node, and at least one slave storage node.

The master compute node is configured to send a read operation request and/or a write operation request to the master storage node, and is configured to send a read operation request to the slave storage node;

the slave compute node is configured to send a read operation request to the master storage node and/or the slave storage node;

the master storage node is configured to: perform a write operation based on the received write operation request, and agree on the performed write operation with the at least one slave storage node; and is configured to perform a read operation based on the received read operation request;

the slave storage node is configured to: agree with the master storage node on the write operation performed by the master storage node, and is configured to perform a read operation based on the received read operation request;

the master compute node is further configured to send a first write operation request to the master storage node; and the master storage node is configured to: receive the first write operation request, agree on a first write operation based on the first write operation request after agreeing on a received log with the at least one slave storage node, and send, to the master compute node, identification information and a response to the first write operation request after agreeing on the first write operation with the at least one slave storage node, where the identification information is used to indicate the agreed log between the master storage node and the at least one slave storage node.

For implementation of the master compute node, correspondingly refer to implementation of the node described in any one of the third aspect or the possible implementations of the third aspect. For implementation of the master storage node, correspondingly refer to implementation of the node described in any one of the fourth aspect or the possible implementations of the fourth aspect.

According to a sixth aspect, an embodiment of the present invention provides a chip system. The chip system includes at least one processor, a memory, and an interface circuit. The memory, the transceiver, and the at least one processor are connected to each other by using a line. The at least one memory stores an instruction, and when the instruction is executed by the processor, the method described in any one of the first aspect, the possible implementations of the first aspect, the second aspect, or the possible implementations of the second aspect is implemented.

According to a seventh aspect, an embodiment of the present invention provides a computer-readable storage medium. The computer-readable storage medium stores a program instruction, and when the program instruction is run on a processor, the method described in any one of the first aspect, the possible implementations of the first aspect, the second aspect, or the possible implementations of the second aspect is implemented.

According to an eighth aspect, an embodiment of the present invention provides a computer program product. When the computer program product is run on a processor, the method described in any one of the first aspect, the possible implementations of the first aspect, the second aspect, or the possible implementations of the second aspect is implemented.

By implementing the embodiments of the present invention, the first node sends, during initialization, the first write operation request to the master storage node, and then the master storage node agrees on the first write operation after agreeing on the received log with the slave storage node. In this way, when subsequently feeding back the submitted log to the first node, the master storage node does not miss any received log, so that the first node and the master storage node keep consistency on the recorded LSN, and the log collision problem caused by the inconsistent LSNs is avoided.

BRIEF DESCRIPTION OF DRAWINGS

The following describes the accompanying drawings used in embodiments of the present invention.

DESCRIPTION OF EMBODIMENTS

The embodiments of the present invention are described below with reference to the accompanying drawings in the embodiments of the present invention.

Figure 1:
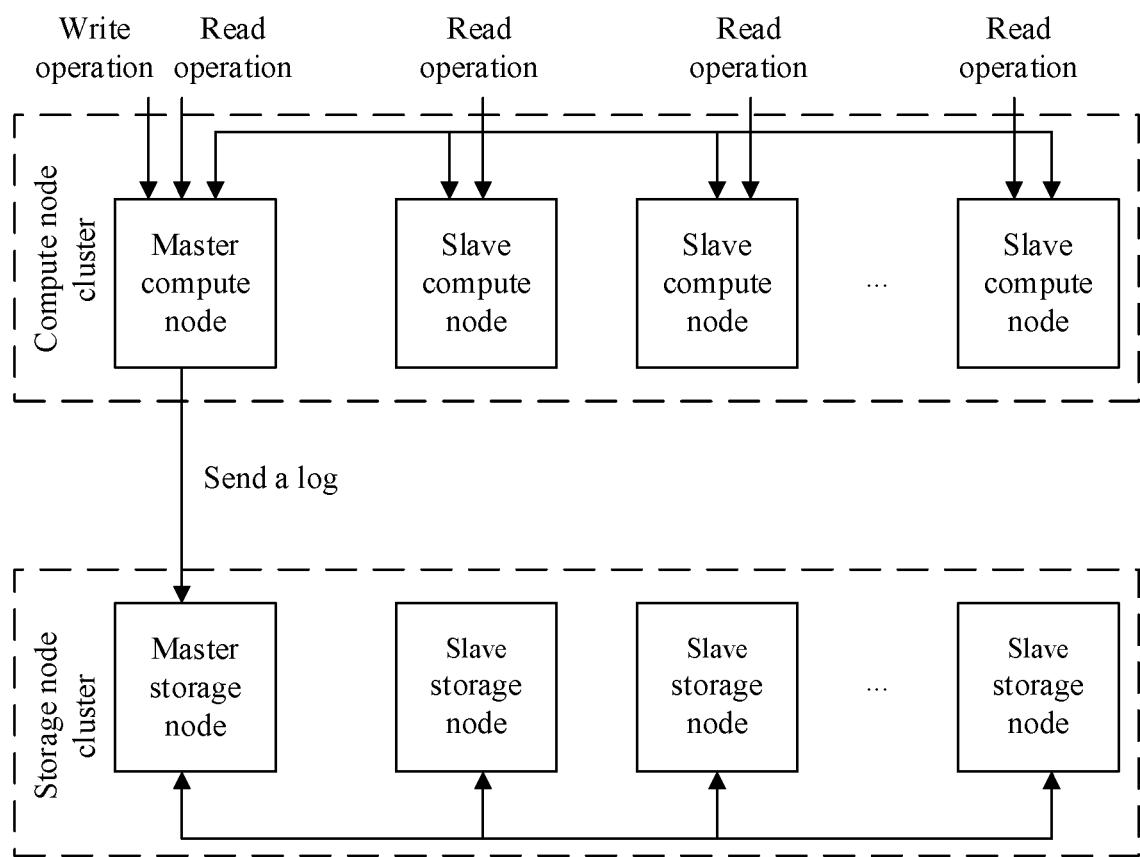
FIG. 1 is a schematic architectural diagram of a log processing system in the prior art.
Figure 2A:
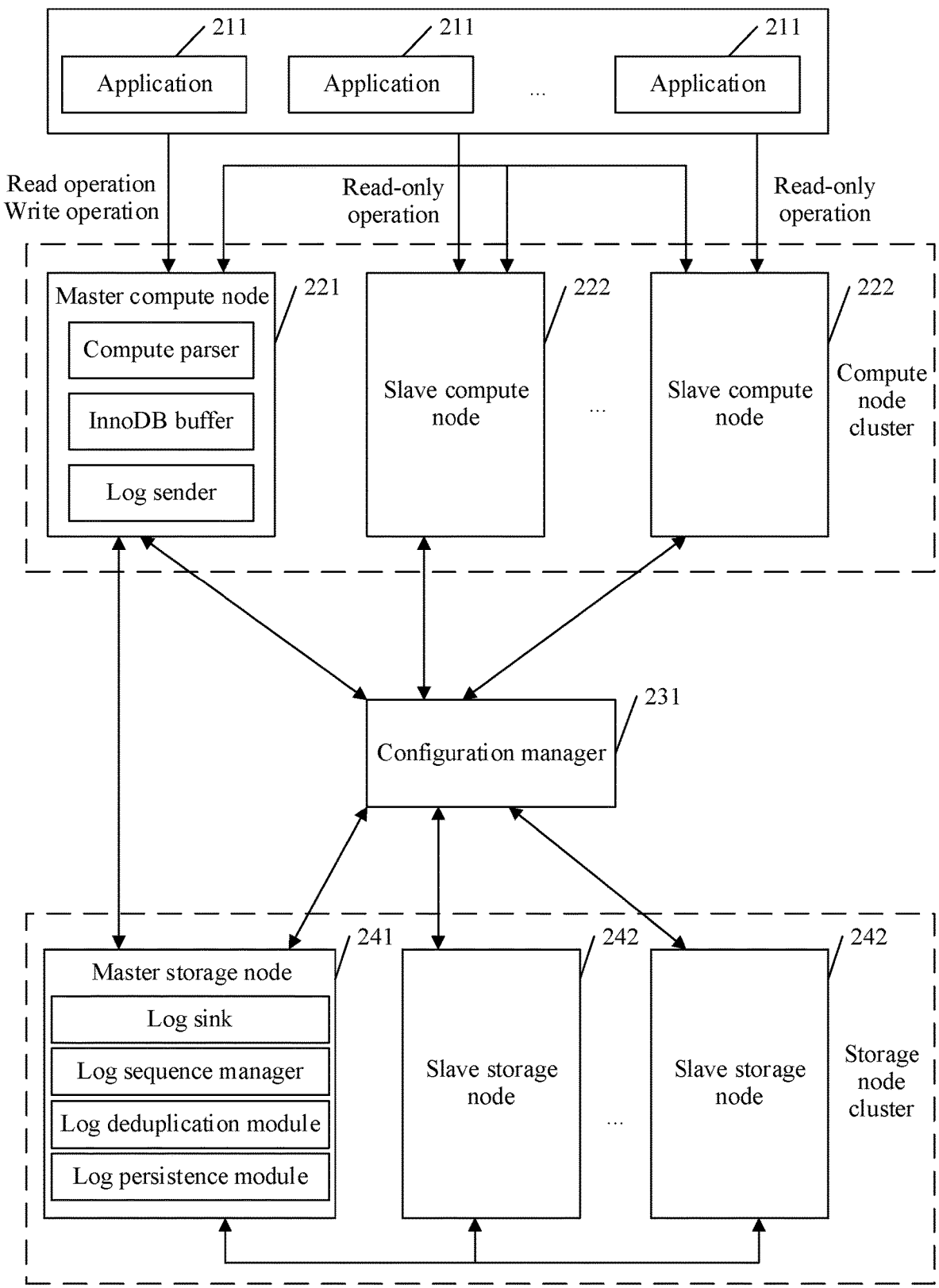
FIG. 2A is a schematic architectural diagram of a log processing system according to an embodiment of the present invention.

FIG. 2A is a schematic structural diagram of a log processing system 20 according to an embodiment of the present invention. The log processing system 20 includes an application 211, a master compute node 221, a slave compute node 222, a configuration manager 231, a master storage node 241, and a slave storage node 242. There may be one or more applications 211, and three applications 211 are used as an example for illustration in FIG. 2A. One master compute node and at least one slave compute node form a compute node cluster. Two slave compute nodes are used as an example for illustration in FIG. 2A. A heartbeat may be maintained between the nodes in the compute node cluster for fault recovery. When the master compute node is faulty or has a load problem, a slave compute node is elected from the compute node cluster as a new master compute node. One master storage node and at least one slave storage node form a storage node cluster. Two slave storage nodes are used as an example for illustration in FIG. 2A. A heartbeat may be maintained between the nodes in the storage node cluster for fault recovery. When the master storage node is faulty or has a load problem, a slave storage node is elected from the storage node cluster as a new master storage node. The following describes a log processing process with reference to the application 211, the master compute node 221, the slave compute node 222, the configuration manager 231, the master storage node 241, and the slave storage node 242.

The application 211 may initiate a data read request and a data write request to the master compute node 221, and may initiate a data read request to the slave compute node 222. The master compute node and the slave compute node may read data from the storage cluster based on the data read requests.

The master compute node 221 may include a compute parser, an InnoDB buffer, and a log sender. The compute parser is configured to parse a compute statement to generate an execution policy. The InnoDB buffer is configured to buffer a log or other database data. The log sender is configured to send the log to the master storage node. Specifically, after the master compute node 221 receives the data write request sent by the application 211, the compute parser executes a corresponding compute statement to respond to the request, for example, to generate a log. The generated log may be buffered in the InnoDB buffer, and then the log sender sends the buffered log to the master storage node 241 for storage.

The master storage node 241 may include a log sink, a log sequence manager, a log deduplication module, and a log persistence module. The log sink is configured to receive the log and other information (for example, a term identifier used to indicate an update status of the master compute node 221) that are sent by the log sender of the master compute node. The log sequence manager is configured to maintain, in a memory and a disk, a log sequence number (log sequence number, LSN) of a log agreed in the storage node cluster 240. The agreed log is a log that has been synchronized by the master storage node 241 to more than half of the nodes in the storage node cluster 240. The log deduplication module is used to filter out a duplicate log. The log persistence module is configured to: locally persist a log, and replicate the log to another storage node by using a consensus synchronization and replication protocol, to persist the log.

The configuration manager 231 is configured to store some information that needs to be used by the nodes such as the master compute node 221, the slave compute node 222, the master storage node 241, and the slave storage node 242, for example, the iteration (term) identifier used to indicate the update status of the master compute node 221, and information used to indicate a running status (for example, whether a fault occurs) of each node in the storage node cluster 240.

It may be understood that the modules (or components) in the master compute node 221 and the master storage node 241 are function modules obtained through division based on functions. In specific implementation, some function modules may be divided into more fine function modules, and some function modules may be combined into one function module. Regardless of whether the function modules are divided or combined, a general log processing procedure performed by the master compute node 221 and a general log processing procedure performed by the master storage node 241 are the same as those described above. Usually, each function module corresponds to respective program code (or a program instruction). When the program code corresponding to each of these function modules is run on a processor, the function module is enabled to perform a corresponding procedure to implement a corresponding function.

Figure 2B:
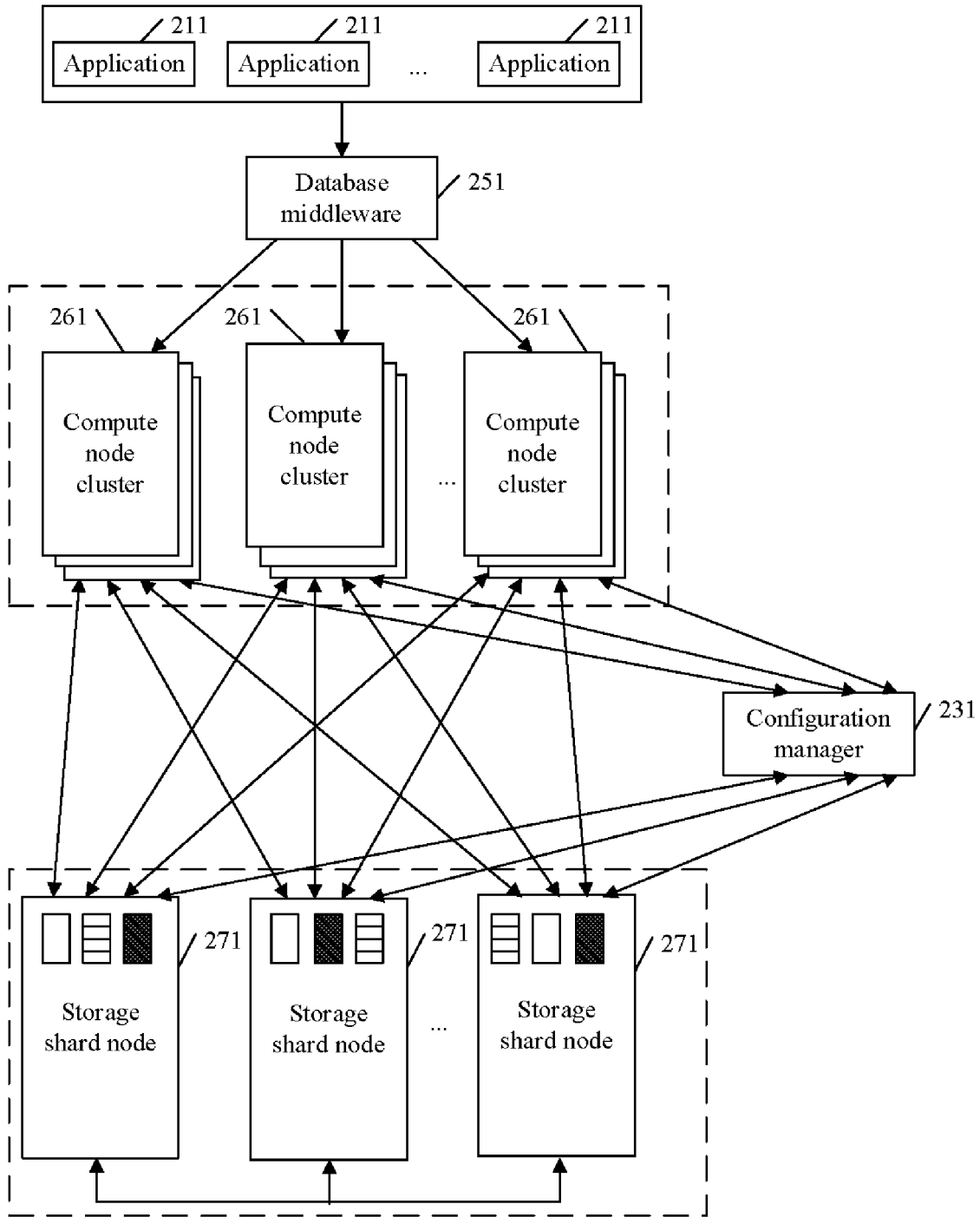
FIG. 2B is a schematic architectural diagram of another log processing system according to an embodiment of the present invention.

In addition, a log compute part and a log storage part may be pooled, and a pooling architecture is shown in FIG. 2B. The pooling architecture includes applications 211, database middleware 251, compute node clusters 261, a configuration manager 231, and storage shard nodes 271. The database middleware 251 is responsible for allocating, to the compute node clusters 261 in a centralized manner, data read requests and data write requests that are initiated by the applications 211. There are a plurality of compute node clusters 261, and each compute node cluster 261 includes one master compute node and at least one slave compute node. There are a plurality of storage shard nodes 271, each storage shard node 271 includes a plurality of shards. A multi-shard structure (in FIG. 2B, small blocks with a same filler in the storage allocation nodes jointly form one multi-shard structure) formed by one storage shard provided by each storage shard node is equivalent to the storage node cluster shown in FIG. 2A. Each shard in the multi-shard structure is equivalent to one node in the storage node cluster shown in FIG. 2A, one shard in the multi-shard structure is equivalent to the master storage node in the storage node cluster, and other shards in the multi-shard structure are equivalent to the slave storage nodes in the storage node cluster. Therefore, the architecture shown in FIG. 2B is equivalent to integration of a plurality of log processing systems 20, and the plurality of log processing systems 20 share one storage node cluster. In view of the architecture relationship between the architecture shown in FIG. 2B and the log processing system 20 shown in FIG. 2A, principles for implementing inventive points of the embodiments of the present invention based on the log processing system 20 shown in FIG. 2A are the same as principles for implementing the inventive points based on the architecture shown in FIG. 2B. Subsequent method embodiments and apparatus embodiments are mainly described based on the log processing system 20 shown in FIG. 2A.

Figure 3:
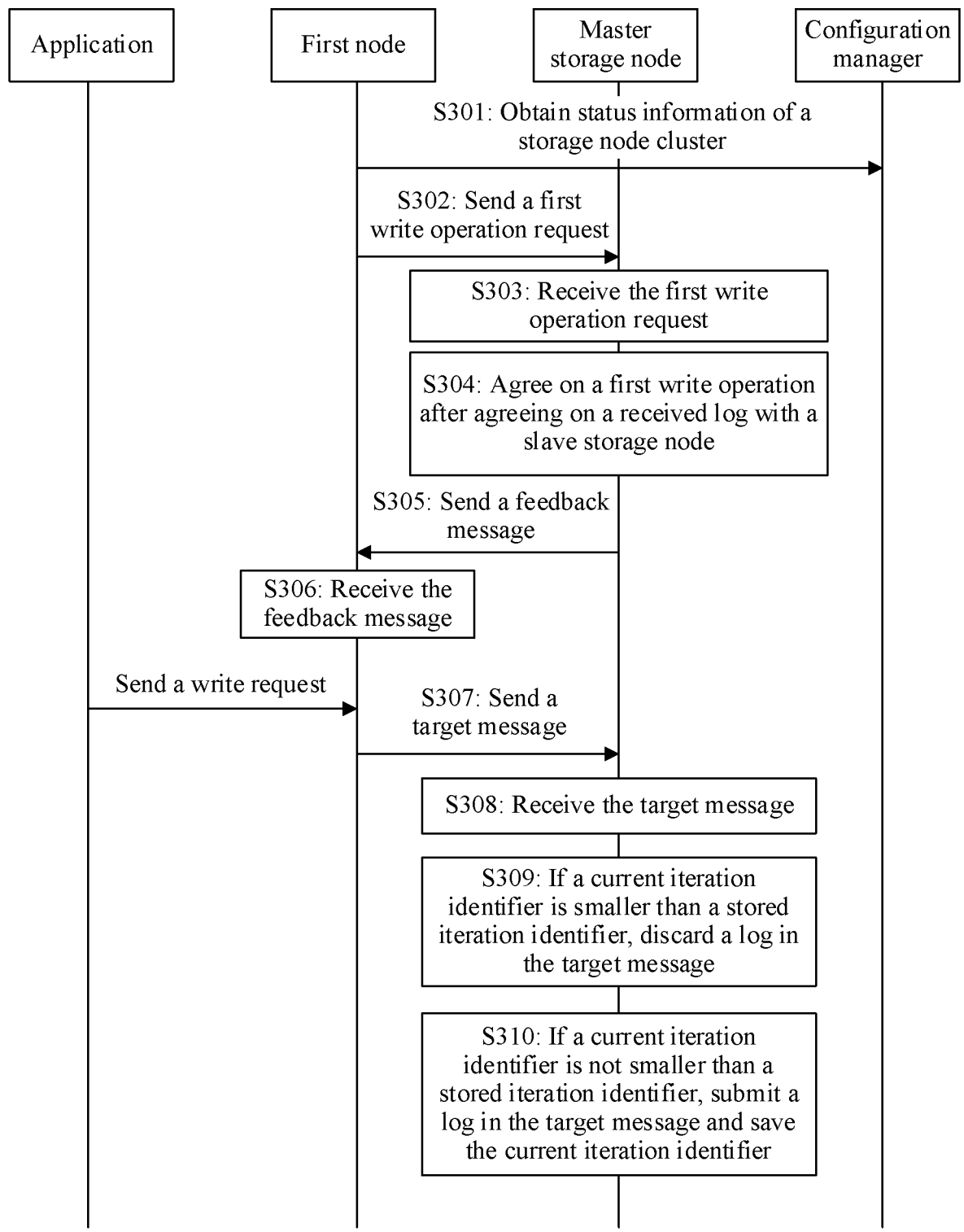
FIG. 3 is a schematic flowchart of a log processing method according to an embodiment of the present invention.

FIG. 3 shows a log synchronization method according to an embodiment of the present invention. The method may be implemented based on the log processing system 20 shown in FIG. 2A, may be implemented based on the architecture shown in FIG. 2B, or may be implemented based on another architecture. The method includes but is not limited to the following steps.

Step S301: A first node obtains, during initialization, a status message of a storage node cluster.

Specifically, the first node is a master compute node that has a write operation capability and a read operation capability in a compute node cluster (for example, each compute node in the compute node cluster may be a structured query language (SQL) node). Usually, nodes in the compute node cluster determine and elect, based on information such as a survival status and a load size, one node as the master compute node that has the read operation capability and the write operation capability. In a first case, the first node has been elected as the master compute node by the nodes in the compute node cluster for a period of time, and is restarted now. In this case, the first node will undergo an initialization. In a second case, the first node is just elected as the master compute node by the nodes in the compute node cluster, and the first node needs to be initialized first when running as the master compute node. In addition, the status message records which storage node in storage nodes in the storage node cluster is a master storage node and which one or more storage nodes are slave storage nodes. Optionally, the status message may further record a survival status of each storage node in the storage node cluster.

Step S302: The first node sends a first write operation request to the master storage node based on the status message.

Specifically, the first node may determine, based on the status message, the master storage node in the storage node cluster, and send the first write operation request to the master storage node. The first write operation request is used to request the master storage node to agree on the first write operation with the slave storage node. Usually, if the master storage node completes synchronization of the first write operation to more than half of the nodes in the storage node cluster, it is considered that the master storage node and the slave storage node in the storage node cluster agree on the first write operation. Optionally, the first write operation request may be specifically a no-operation noop request. To be specific, the first write operation request is used to request the master storage node to agree on a no-operation noop with the slave storage node. That is, the first write operation herein is a no-operation noop.

Step S303: The master storage node receives the first write operation request sent by the first node.

Step S304: The master storage node agrees on the first write operation after agreeing on a received log with the slave storage node.

Specifically, according to a working mechanism of the storage nodes in the storage node cluster, before agreeing on the first write operation with the slave storage node, the master storage node first agrees with the slave storage node on the log that is received before the first write operation request and is not agreed on. The master storage node and the slave storage node agree on the first write operation request after agreeing on all received logs. For example, it is assumed that when the first node is initialized, the master storage node has received logs whose LSNs are 1, 2, and 3, and when the master storage node perceives that the initialization of the first node is completed, the master storage node has agreed with the slave storage node on the logs whose LSNs are 1 and 2. In this case, the master storage node agrees on the first write operation with the slave storage node according to instruction of the first write operation request. According to the working mechanism of the storage nodes in the storage node cluster, because the master storage node receives the log whose LSN is 3 before receiving the first write operation request, the master storage node continues to agree with the slave storage node on the log whose LSN is 3, and then agrees on the first write operation with the slave storage node. In this way, the master storage node finally agrees with the slave storage node on the log whose LSN is 3.

In this embodiment of the present invention, that the master storage node agrees on the received log with the slave storage node means that the master storage node synchronizes the received log to more than half of the nodes in the storage node cluster. The master storage node may synchronize the log by using a consensus synchronization and replication protocol such as Paxos, raft, or zab.

Step S305: The master storage node sends, to the first node, identification information and a response to the first write operation request.

Specifically, after agreeing on the first write operation with the slave storage node, the master storage node sends, to the first node, the identification information and the response to the first write operation request. The identification information is used to indicate an LSN of the agreed log, so that the first node learns the latest LSN of the agreed log in the master storage node.

Step S306: The first node receives a feedback message that is sent after the master storage node agrees on the first write operation with the slave storage node.

Specifically, the first node parses the feedback message to obtain the identification information and the response to the first write operation request that are in the feedback message. The first node can determine, based on the identification information, the LSN of the agreed log in the master storage node. When the first node subsequently sends a log to the master storage node, an LSN of the newly sent log is numbered from the LSN of the agreed log. In this way, the LSN of the newly sent log is not duplicated with the LSN of the agreed log. This avoids data collision.

In another optional solution, after the first node receives the feedback message that is sent after the master storage node agrees on the first write operation with the slave storage node, the method may further include a procedure S307 to S310.

Step S307: The first node sends a target message to the master storage node.

Specifically, the target message includes a current iteration identifier and at least one log. Optionally, the target message may be specifically stored on a log sender, and is subsequently sent by the log sender; the current iteration identifier is used by the master storage node to determine whether the target message is from a latest master compute node; and an iteration identifier in a target message sent by any new master compute node (which is referred to as the current iteration identifier for short) is greater than an iteration identifier in a target message sent by a previous master compute node (which is referred to as a previous iteration identifier for short).

To be specific, in this embodiment of the present invention, when each master compute node sends a target message to the master storage node, an iteration identifier is added to the target message. Iteration identifiers sent by master compute nodes in different periods are different. For example, an iteration identifier sent by a master compute node elected during a $T^{th}$ election in the compute node cluster is R, and an iteration identifier sent by a master compute node elected during a $(T+1)^{th}$ election in the compute node cluster is R+j. R, T, and j each is a positive integer. Assuming that a second node and a third node exist in the compute node cluster, the following relationship exists: if the second node is a master compute node later than the third node, an iteration identifier in a target message sent by the second node to the master storage node is greater than an iteration identifier in a target message sent by the third node to the master storage node; if the second node is a master compute node earlier than the third node, an iteration identifier in a target message sent by the second node to the master storage node is smaller than an iteration identifier in a target message sent by the third node to the master storage node; and if the second node and the third node are a same node and are a master compute node after same initialization, an iteration identifier in a target message sent by the second node to the master storage node is equal to an iteration identifier in a target message sent by the third node to the master storage node.

Optionally, that the first node sends a target message to the master storage node may be specifically: The first node asynchronously sends M target messages to the master storage node by using N slots, where each slot in the N slots is used to send one target message each time, and a target message including a log with an earlier generation time is sent earlier; and in any two target messages that are sent close to each other, a latter target message is sent only after a former sent target message is received by the master storage node, a generation time of any log in the latter sent target message is later than a generation time of any log in the former sent target message, and when one target message includes a plurality of logs, a log with an earlier generation time in the target message is sent earlier. M and N each is an integer greater than or equal to 2. It may be understood that, when a plurality of slots are used to asynchronously send the target messages, when one slot completes sending the target message but is still waiting for the master storage node to feed back a processing result of the target message, another slot can start to send another target message. This is different from the prior art in which the another target message is sent only after the master storage node feeds back the result. Therefore, in this embodiment of the present invention, a time for waiting for the master storage node to feed back the result is fully used, and a time span for sending the target messages is shortened. This improves sending efficiency.

Step S308: The master storage node receives the target message.

Specifically, the master storage node parses out the current iteration identifier and the at least one log in the currently received target message. In addition, the master storage node also stores an iteration identifier, and the stored iteration identifier is an iteration identifier in a target message that is received by the master storage node last time, that is, a previous iteration identifier. The master storage node compares the current iteration identifier in the currently received target message with the previous iteration identifier stored in the master storage node, to determine whether the currently received target message is sent by the latest master compute node. Optionally, the comparison operation may be specifically completed by a log sink on the master storage node.

Step S309: If the current iteration identifier in the currently received target message is smaller than the previous iteration identifier stored in the master storage node, the master storage node discards the log in the currently received target message.

Specifically, if the current iteration identifier in the currently received target message is smaller than the previous iteration identifier stored in the master storage node, it indicates that the currently received target message is not sent by the latest master compute node in the compute node cluster. Therefore, the master storage node discards the log in the currently received target message, to avoid a collision between a log sent by a previous master compute node and the log sent by the latest master compute node.

Step S310: If the current iteration identifier in the currently received target message is not smaller than the previous iteration identifier stored in the master storage node, the master storage node submits the log in the currently received target message to the storage node cluster in which the master storage node is located, and replaces the iteration identifier stored in the master storage node with the current iteration identifier.

Specifically, if the current iteration identifier in the currently received target message is greater than the previous iteration identifier stored in the master storage node, it indicates that the currently received target message is sent by the latest master compute node in the compute node cluster. Therefore, the log in the target message is useful, and the master storage node submits the log in the currently received target message to the storage node cluster in which the master storage node is located. In addition, the master storage node further replaces the iteration identifier stored in the master storage node with the current iteration identifier, for subsequent reference and comparison.

In this embodiment of the present invention, a configuration manager may further be disposed. The configuration manager is a preconfigured node configured to maintain information required by the master compute node and information required by the master storage node. The configuration manager may be a single hardware device or a cluster including a plurality of hardware devices, for example, a cluster based on a zookeeper technology.

For example, that the first node obtains, during initialization, a status message of the storage node cluster may be specifically: the first node obtains, during initialization, the status message of the storage node cluster from the configuration manager. That is, the status message is stored in the configuration manager.

For another example, the configuration manager may store the iteration identifier, and that the configuration manager stores the iteration identifier includes the following possible cases.

In a first case, before the first node sends the target message to the master storage node, the first node sends a first request to the configuration manager, to request the current iteration identifier; then, the configuration manager sends the current iteration identifier to the master storage node; and then, the first node receives the current iteration identifier sent by the configuration manager. Subsequently, the current iteration identifier is added to the target message sent by the first node. It should be noted that each time the configuration manager perceives a new master compute node, the configuration manager adds j to an original iteration identifier to obtain a new iteration identifier.

In a second case, before the first node sends the target message to the master storage node, the first node sends a first request to the preconfigured configuration manager, to request the previous iteration identifier; then, the configuration manager sends the previous iteration identifier to the first node; and then, the first node receives the previous iteration identifier sent by the configuration manager, and generates the current iteration identifier based on the previous iteration identifier. For example, a new iteration identifier obtained by adding T to the previous iteration identifier is used as the current iteration identifier. Subsequently, the current iteration identifier may be added to the target message sent by the first node. In addition, the first node further sends, to the configuration manager, the generated current iteration identifier that is used by the latest master compute node to send the target message.

In this embodiment of the present invention, the first write operation request sent by the master compute node to the master storage node may further carry the iteration identifier, and the iteration identifier is used by the master storage node to determine whether the first write operation request is from the latest master compute node. An iteration identifier in a first write operation request sent by any new master compute node is greater than an iteration identifier in a first write operation request sent by a latest master compute node. In this way, the master storage node may determine, based on the iteration identifier in the received first write operation request, whether the iteration identifier is sent by the latest master compute node. If yes, consensus is reached on a no-operation noop based on the first write operation request; or if no, the first write operation request is discarded and no consensus is reached on a no-operation noop. For specific principles, refer to the foregoing descriptions of the iteration identifier in the target message. Details are not described herein again.

In this embodiment of the present invention, after the master storage node and the slave storage node agree on the log, the LSN of the agreed log is stored by using a list, or the LSN of the agreed log is stored in a hash mapping manner. When a log is subsequently received, the master storage node compares an LSN of the received log with the list or a hash mapping relationship, to check whether the received log has been received before. If yes, the master storage node discards the log; or if no, the master storage node retains the log and saves the LSN of the log to the foregoing list or hash mapping relationship. In addition, the master storage node may alternatively process the agreed log by using a log replay state machine, to replay database data processed in a manner indicated by the log.

In the method shown in FIG. 3, the first node sends, during initialization, the first write operation request to the master storage node, and then the master storage node and the slave storage node agrees on the first write operation after agreeing on the received log. In this way, when subsequently feeding back a submitted log to the first node, the master storage node does not miss any received log, so that the first node and the master storage node keep consistency on a recorded LSN, and a log collision problem caused by inconsistent LSNs is avoided.

The method in the embodiments of the present invention is described above in detail, and apparatuses in the embodiments of the present invention are provided below.

Figure 4:
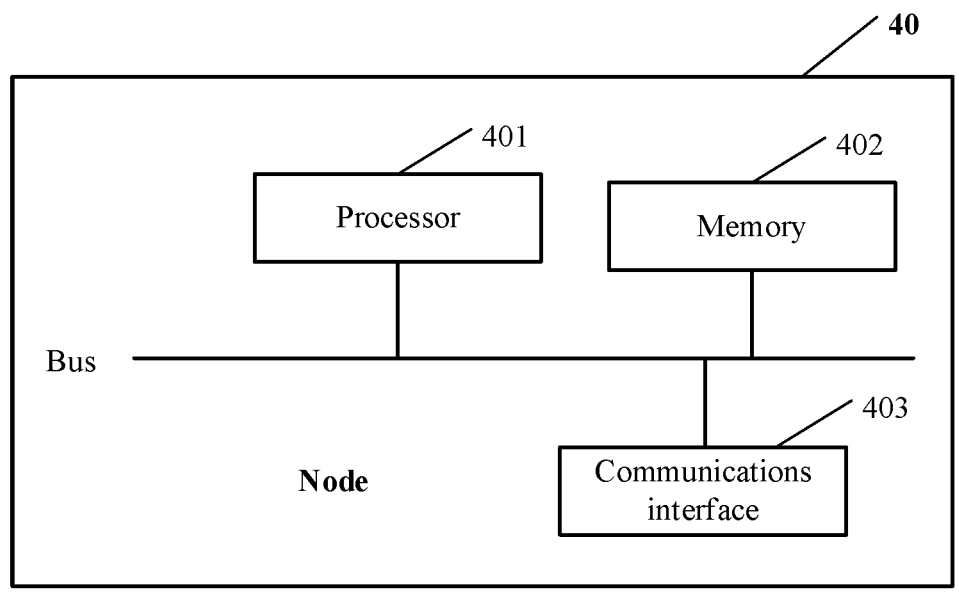
FIG. 4 is a schematic structural diagram of a first node according to an embodiment of the present invention.

FIG. 4 shows a node 40 according to an embodiment of the present invention. The node 40 includes a processor 401, a memory 402, and a communications interface 403. The processor 401, the memory 402, and the communications interface 403 are connected to each other by using a bus.

The memory 402 includes but is not limited to a random access memory (RAM), a read-only memory (ROM), an erasable programmable read-only memory (EPROM), or a portable read-only memory (compact disc read-only memory, CD-ROM). The memory 402 is configured to store a related instruction and related data. The communications interface 403 is configured to receive and send data.

The processor 401 may be one or more central processing units (CPU(s)). When the processor 401 is one CPU, the CPU may be a single-core CPU or a multi-core CPU.

The processor 401 in the node 40 is configured to read program code stored in the memory 402, to perform the following operations:

first, obtaining, during initialization, a status message of a storage node cluster, where the status message marks a master storage node of the storage node cluster; and the node is a master compute node that has a write operation capability and a read operation capability in a compute node cluster; then, sending, by using the communications interface, a first write operation request to the master storage node based on the status message, so that the master storage node agrees on a first write operation after agreeing on a received log with a slave storage node in the storage node cluster; and then, receiving, by using the communications interface, a feedback message that is sent after the master storage node agrees on the first write operation with the slave storage node in the storage node cluster, where the feedback message includes identification information and a response to the first write operation request, and the identification information is used to indicate the agreed log.

By performing the foregoing operations, the node sends, during initialization, the first write operation request to the master storage node, and then the master storage node agrees on the first write operation after agreeing on the received log with the slave storage node. In this way, when subsequently feeding back a submitted log to the node, the master storage node does not miss any received log, so that the node and the master storage node keep consistency on a recorded LSN, and a log collision problem caused by inconsistent LSNs is avoided.

In another optional solution, after the receiving, by using the communications interface 403, a feedback message that is sent after the master storage node agrees on the first write operation with the slave storage node in the storage node cluster, the processor 401 is further configured to: send a target message to the master storage node by using the communications interface, where the target message includes a current iteration identifier, and the current iteration identifier is used by the master storage node to determine whether the target message is from a latest master compute node; and the current iteration identifier is greater than a previous iteration identifier sent by a latest master compute node. To be specific, master compute nodes in different periods are marked by using different iteration identifiers, and the iteration identifiers are added to the target messages to be sent. In this way, the master storage node can determine, by using the iteration identifier in the target message, whether the target message is a target message sent by the latest master compute node, and therefore can determine whether to discard the target message.

In another optional solution, before the sending a target message to the master storage node by using the communications interface 403, the processor 401 is further configured to: first, send a first request to a preset configuration manager by using the communications interface, to request the current iteration identifier, where the configuration manager is a preconfigured node configured to maintain information required by the master compute node and information required by the master storage node; and then, receive, by using the communications interface, the current iteration identifier sent by the configuration manager. To be specific, the iteration identifier is independently stored by the configuration manager and may be queried for by any node that may become the master compute node in the compute node cluster, instead of being stored in each node in the compute node cluster. This can avoid an iteration identifier collision caused by inconsistent iteration identifiers maintained by the nodes in the compute node cluster.

In another optional solution, before the sending a target message to the master storage node by using the communications interface 403, the processor 401 is further configured to: first, send a first request to a preset configuration manager by using the communications interface, to request the previous iteration identifier, where the configuration manager is a preconfigured node configured to maintain information required by the master compute node and information required by the master storage node; then, receive, by using the communications interface, the previous iteration identifier sent by the configuration manager; and then, generate the current iteration identifier based on the previous iteration identifier. To be specific, the iteration identifier is independently stored by the configuration manager and may be queried for by any node that may become the master compute node in the compute node cluster, instead of being stored in each node in the compute node cluster. This can avoid an iteration identifier collision caused by inconsistent iteration identifiers maintained by the nodes in the compute node cluster.

In another optional solution, the target message includes at least one log; and the sending, by the processor 401, a target message to the master storage node by using the communications interface 403 is specifically: asynchronously sending, by using the communications interface 403, M target messages to the master storage node by using N slots, where each slot in the N slots is used to send one target message each time, and a target message including a log with an earlier generation time is sent earlier; and in any two target messages that are sent close to each other, a latter target message is sent only after a former sent target message is received by the master storage node, a generation time of any log in the latter sent target message is later than a generation time of any log in the former sent target message, and M and N each is an integer greater than or equal to 2. It may be understood that, when a plurality of slots are used to asynchronously send the target messages, when one slot completes sending the target message but is still waiting for the master storage node to feed back a processing result of the target message, another slot can start to send another target message. This is different from the prior art in which the another target message is sent only after the master storage node feeds back the result. Therefore, in this embodiment of the present invention, a time for waiting for the master storage node to feed back the result is fully used, and a time span for sending the target messages is shortened. This improves sending efficiency.

In another optional solution, the obtaining, by the processor 401 during initialization, a status message of a storage node cluster is specifically: obtaining, during initialization, the status message of the storage node cluster from the configuration manager, where the configuration manager is the preconfigured node configured to maintain the information required by the master compute node and the information required by the master storage node. To be specific, the status message is independently stored by the configuration manager and may be queried for by any node that may become the master compute node in the compute node cluster, instead of being stored in each node in the compute node cluster. This can avoid a status message collision caused by inconsistent status messages maintained by the nodes in the compute node cluster.

In another optional solution, the node is a new master compute node that has the write operation capability and the read operation capability in the compute node cluster. It should be noted that the new master compute node that has the write operation capability and the read operation capability usually does not know whether the previous master compute node sends a log, and therefore does not know an LSN of the log that has been received by the master storage node. In this case, the latest master compute node sends the first write operation request to the master storage node, to trigger the master storage node to agree on the received log with the slave storage node and feed back the log to the latest master compute node, so that the latest master compute node knows the LSN of the log that has been received by the master storage node. Subsequently, when the latest master compute node sends a log to the master storage node, a case in which different logs have a same LSN does not occur. This avoids a log collision.

It should be noted that for implementation of the operations, refer to corresponding descriptions of the method embodiment shown in FIG. 3. The node in the embodiment shown in FIG. 4 may be the first node in the method embodiment shown in FIG. 3.

In the node 40 described in FIG. 4, the node sends, during initialization, the first write operation request to the master storage node, and then the master storage node agrees on the first write operation after agreeing on the received log with the slave storage node. In this way, when subsequently feeding back the submitted log to the node, the master storage node does not miss any received log, so that node and the master storage node keep consistency on the recorded LSN, and the log collision problem caused by the inconsistent LSNs is avoided.

Figure 5:
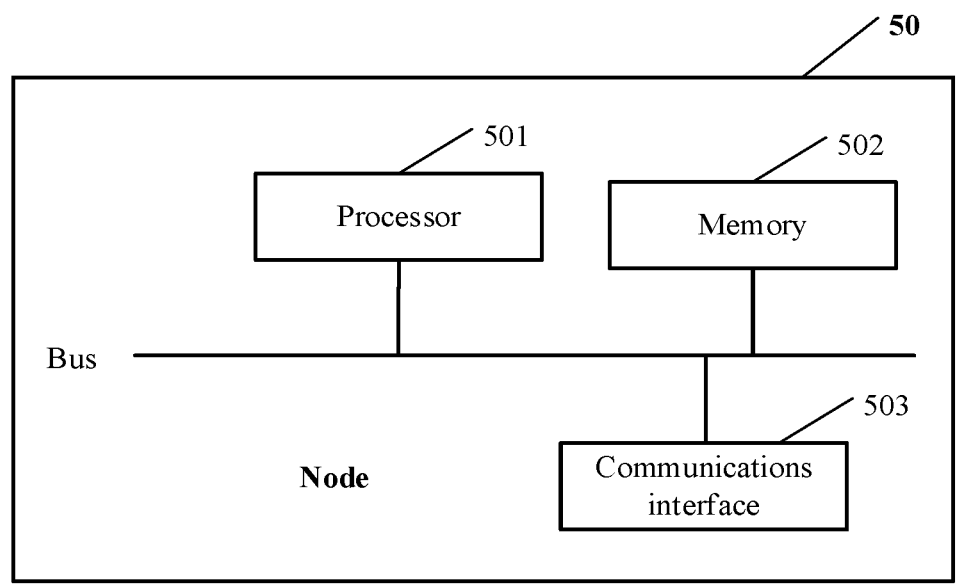
FIG. 5 is a schematic structural diagram of a master storage node according to an embodiment of the present invention.

FIG. 5 shows a node 50 according to an embodiment of the present invention. The node 50 includes a processor 501, a memory 502, and a communications interface 503. The processor 501, the memory 502, and the communications interface 503 are connected to each other by using a bus.

The memory 502 includes but is not limited to RAM, a ROM, an EPROM), or a portable read-only memory (compact disc read-only memory, CD-ROM). The memory 502 is configured to store a related instruction and related data. The communications interface 503 is configured to receive and send data.

The processor 501 may be one or more CPUs. When the processor 501 is one CPU, the CPU may be a single-core CPU or a multi-core CPU.

The processor 501 in the node 50 is configured to read program code stored in the memory 502, to perform the following operations:

first, receiving, by using the communications interface 503, a first write operation request sent by a first node, where the first node is a master compute node that has a write operation capability and a read operation capability in a compute node cluster; then, agreeing, based on the first write operation request, on a first write operation after agreeing on a received log with a slave storage node in a storage node cluster in which the node is located; and then, sending, to the first node by using the communications interface 503, identification information and a response to the first write operation request after agreeing on the first write operation with the slave storage node, where the identification information is used to indicate the agreed log.

By performing the foregoing operations, the first node sends, during initialization, the first write operation request to the node, and then the node agrees on the first write operation after agreeing on the received log with the slave storage node. In this way, when subsequently feeding back a submitted log to the first node, the node does not miss any received log, so that the first node and the node keep consistency on a recorded LSN, and a log collision problem caused by inconsistent LSNs is avoided.

In another optional solution, after the sending, to the first node by using the communications interface 503, an LSN of the agreed log and a response to the first write operation request, the processor 501 is further configured to: first, receive a target message by using the communications interface 503, where the target message includes an iteration identifier and at least one log; and then, if the current iteration identifier is smaller than an iteration identifier stored in the node, discard the log in the currently received target message, where the iteration identifier stored in the node is a previous iteration identifier received by the node. To be specific, master compute nodes in different periods are marked by using different iteration identifiers, and the iteration identifiers are added to the target messages to be sent. In this way, the node can determine, by using the iteration identifier in the target message, whether the target message is a target message sent by a latest master compute node, and therefore can determine whether to discard the target message.

In another optional solution, the processor 501 is further configured to: if the current iteration identifier is not smaller than the iteration identifier stored in the node, synchronize, by using the communications interface 503, the log in the currently received target message to the storage node cluster in which the node is located; and replace the iteration identifier stored in the node with the current iteration identifier.

In another optional solution, the receiving, by the processor 501, a target message by using the communications interface 503 is specifically: receiving, by using the communications interface 503, M target messages that are asynchronously sent by the first node by using N slots, where each slot in the N slots is used to send one target message each time, and a target message including a log with an earlier generation time is sent earlier; and in any two target messages that are sent close to each other, a latter target message is sent only after a former sent target message is received by the node, a generation time of any log in the latter sent target message is later than a generation time of any log in the former sent target message, and M and N each is an integer greater than or equal to 2. It may be understood that, when a plurality of slots are used to asynchronously send the target messages, when one slot completes sending the target message but is still waiting for the node to feed back a processing result of the target message, another slot can start to send another target message. This is different from the prior art in which the another target message is sent only after the node feeds back the result. Therefore, in this embodiment of the present invention, a time for waiting for the node to feed back the result is fully used, and a time span for sending the target messages is shortened. This improves sending efficiency.

In another optional solution, the first node is a new master compute node that has the write operation capability and the read operation capability in the compute node cluster. It should be noted that the new master compute node that has the write operation capability and the read operation capability usually does not know whether a previous master compute node sends a log, and therefore does not know an LSN of the log that has been received by the node. In this case, the latest master compute node sends the first write operation request to the node, to trigger the node to agree on the received log with the slave storage node and feed back the log to the latest master compute node, so that the latest master compute node knows the LSN of the log that has been received by the node. Subsequently, when the latest master compute node sends a log to the node, a case in which different logs have a same LSN does not occur. This avoids a log collision.

It should be noted that for implementation of the operations, refer to corresponding descriptions of the method embodiment shown in FIG. 3. The node in the embodiment shown in FIG. 5 may be the master storage node in the method embodiment shown in FIG. 3.

In the node 50 described in FIG. 5, the first node sends, during initialization, the first write operation request to the node, and then the node agrees on the first write operation after agreeing on the received log with the slave storage node. In this way, when subsequently feeding back the submitted log to the first node, the node does not miss any received log, so that the first node and the node keep consistency on the recorded LSN, and the log collision problem caused by the inconsistent LSNs is avoided.

Figure 6:
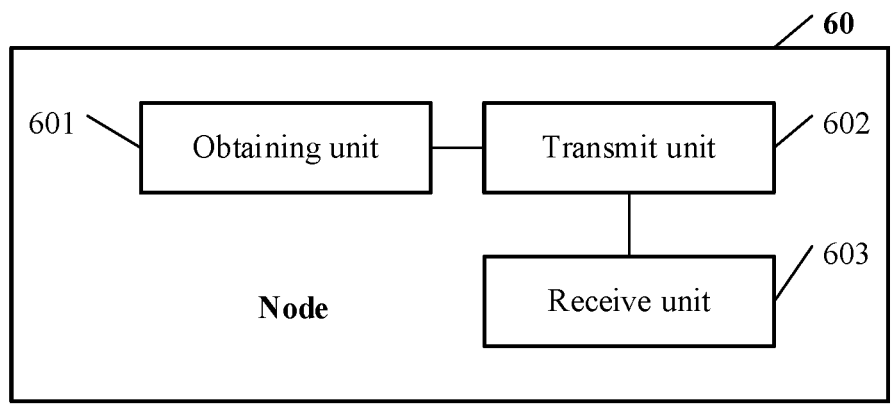
FIG. 6 is a schematic structural diagram of another first node according to an embodiment of the present invention.

FIG. 6 is a schematic structural diagram of a node 60 according to an embodiment of the present invention. The node 60 may include an obtaining unit 601, a transmit unit 602, and a receive unit 603. Each unit is described in detail below.

The obtaining unit 601 is configured to obtain, during initialization, a status message of a storage node cluster, where the status message marks a master storage node of the storage node cluster; and the node is a master compute node that has a write operation capability and a read operation capability in a compute node cluster.

The transmit unit 602 is configured to send a first write operation request to the master storage node based on the status message, so that the master storage node agrees on a first write operation after agreeing on a received log with a slave storage node in the storage node cluster.

The receive unit 603 is configured to receive a feedback message that is sent after the master storage node agrees on the first write operation with the slave storage node in the storage node cluster, where the feedback message includes identification information and a response to the first write operation request, and the identification information is used to indicate the agreed log.

By performing the foregoing steps, the node sends, during initialization, the first write operation request to the master storage node, and then the master storage node agrees on the first write operation after agreeing on the received log with the slave storage node. In this way, when subsequently feeding back a submitted log to the node, the master storage node does not miss any received log, so that the node and the master storage node keep consistency on a recorded LSN, and a log collision problem caused by inconsistent LSNs is avoided.

In another optional solution, the transmit unit 602 is further configured to: send a target message to the master storage node after the receive unit 603 receives the feedback message that is sent after the master storage node agrees on the first write operation with the slave storage node in the storage node cluster, where the target message includes a current iteration identifier, and the current iteration identifier is used by the master storage node to determine whether the target message is from a latest master compute node; and the current iteration identifier is greater than a previous iteration identifier sent by a previous master compute node. To be specific, master compute nodes in different periods are marked by using different iteration identifiers, and the iteration identifiers are added to the target messages to be sent. In this way, the master storage node can determine, by using the iteration identifier in the target message, whether the target message is a target message sent by the latest master compute node, and therefore can determine whether to discard the target message.

In another optional solution, the transmit unit 602 is further configured to: before sending the target message to the master storage node, send a first request to a preset configuration manager, to request the current iteration identifier. The receive unit 603 is further configured to receive the current identifier sent by the configuration manager. To be specific, the iteration identifier is independently stored by the configuration manager and may be queried for by any node that may become the master compute node in the compute node cluster, instead of being stored in each node in the compute node cluster. This can avoid an iteration identifier collision caused by inconsistent iteration identifiers maintained by the nodes in the compute node cluster.

In another optional solution, the node further includes a generation unit. The transmit unit 602 is further configured to: before sending the target message to the master storage node, send a first request to a preset configuration manager, to request the previous iteration identifier, where the configuration manager is a preconfigured node configured to maintain information required by the master compute node and information required by the master storage node; the receive unit 603 is further configured to receive the previous iteration identifier sent by the configuration manager; and the generation unit is configured to generate the current iteration identifier based on the previous iteration identifier. To be specific, the iteration identifier is independently stored by the configuration manager and may be queried for by any node that may become the master compute node in the compute node cluster, instead of being stored in each node in the compute node cluster. This can avoid an iteration identifier collision caused by inconsistent iteration identifiers maintained by the nodes in the compute node cluster.

In another optional solution, the target message includes at least one log; and the sending, by the transmit unit 602, a target message to the master storage node may be specifically: asynchronously sending M target messages to the master storage node by using N slots, where each slot in the N slots is used to send one target message each time, and a target message including a log with an earlier generation time is sent earlier; and in any two target messages that are sent close to each other, a latter target message is sent only after a former sent target message is received by the master storage node, a generation time of any log in the latter sent target message is later than a generation time of any log in the former sent target message, and M and N each is an integer greater than or equal to 2. It may be understood that, when a plurality of slots are used to asynchronously send the target messages, when one slot completes sending the target message but is still waiting for the master storage node to feed back a processing result of the target message, another slot can start to send another target message. This is different from the prior art in which the another target message is sent only after the master storage node feeds back the result. Therefore, in this embodiment of the present invention, a time for waiting for the master storage node to feed back the result is fully used, and a time span for sending the target messages is shortened. This improves sending efficiency.

In another optional solution, the obtaining, by the obtaining unit 601 during initialization, a status message of a storage node cluster may be specifically: obtaining, during initialization, the status message of the storage node cluster from the configuration manager, where the configuration manager is the preconfigured node configured to maintain the information required by the master compute node and the information required by the master storage node. To be specific, the status message is independently stored by the configuration manager and may be queried for by any node that may become the master compute node in the compute node cluster, instead of being stored in each node in the compute node cluster. This can avoid a status message collision caused by inconsistent status messages maintained by the nodes in the compute node cluster.

In another optional solution, the node is a new master compute node that has the write operation capability and the read operation capability in the compute node cluster. It should be noted that the new master compute node that has the write operation capability and the read operation capability usually does not know whether the previous master compute node sends a log, and therefore does not know an LSN of the log that has been received by the master storage node. In this case, the latest master compute node sends the first write operation request to the master storage node, to trigger the master storage node to agree on the received log with the slave storage node and feed back the log to the latest master compute node, so that the latest master compute node knows the LSN of the log that has been received by the master storage node. Subsequently, when the latest master compute node sends a log to the master storage node, a case in which different logs have a same LSN does not occur. This avoids a log collision.

It should be noted that for implementation of the units, refer to corresponding descriptions of the method embodiment shown in FIG. 6. The node in the embodiment shown in FIG. 6 may be the first node in the method embodiment shown in FIG. 3.

In the node 60 described in FIG. 6, the node sends, during initialization, the first write operation request to the master storage node, and then the master storage node agrees on the first write operation after agreeing on the received log with the slave storage node. In this way, when subsequently feeding back the submitted log to the node, the master storage node does not miss any received log, so that node and the master storage node keep consistency on the recorded LSN, and the log collision problem caused by the inconsistent LSNs is avoided.

Figure 7:
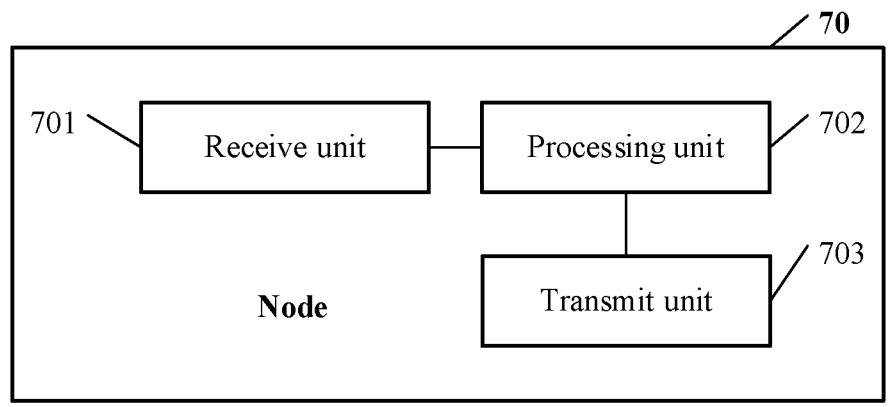
FIG. 7 is a schematic structural diagram of another master storage node according to an embodiment of the present invention.

FIG. 7 is a schematic structural diagram of a node 70 according to an embodiment of the present invention. The node 70 may include a receive unit 701, a processing unit 702, and a transmit unit 703. Each unit is described in detail below.

The receive unit 701 is configured to receive a first write operation request sent by a first node, where the first node is a master compute node that has a write operation capability and a read operation capability in a compute node cluster;

the processing unit 702 is configured to agree, based on the first write operation request, on a first write operation after agreeing on a received log with a slave storage node in a storage node cluster in which the node is located; and the transmit unit 703 is configured to: after the processing unit 702 agrees on the first write operation with the slave storage node, send, to the first node, identification information and a response to the first write operation request, where the identification information is used to indicate the agreed log.

By performing the foregoing steps, the first node sends, during initialization, the first write operation request to the node, and then the node agrees on the first write operation after agreeing on the received log with the slave storage node. In this way, when subsequently feeding back a submitted log to the first node, the node does not miss any received log, so that the first node and the node keep consistency on a recorded LSN, and a log collision problem caused by inconsistent LSNs is avoided.

In an optional solution, the node 70 further includes a discarding unit. The receive unit 701 is further configured to: receive a target message after the transmit unit 703 sends, to the first node, an LSN of the agreed log and the response to the first write operation request, where the target message includes a current iteration identifier and at least one log. The discarding unit is configured to: if the current iteration identifier is smaller than an iteration identifier stored in the node, discard the log in the currently received target message, where the iteration identifier stored in the node is a previous iteration identifier received by the node. To be specific, master compute nodes in different periods are marked by using different iteration identifiers, and the iteration identifiers are added to the target messages to be sent. In this way, the node can determine, by using the iteration identifier in the target message, whether the target message is a target message sent by a latest master compute node, and therefore can determine whether to discard the target message.

In another optional solution, the processing unit 702 is further configured to: if the current iteration identifier is not smaller than the iteration identifier stored in the node, synchronize the log in the currently received target message to the storage node cluster in which the node is located, and replace the iteration identifier stored in the node with the current iteration identifier.

In another optional solution, the receiving, by the receive unit 701, a target message may be specifically: receiving M target messages that are asynchronously sent by the first node by using N slots, where each slot in the N slots is used to send one target message each time, and a target message including a log with an earlier generation time is sent earlier; and in any two target messages that are sent close to each other, a latter target message is sent only after a former sent target message is received by the node, a generation time of any log in the latter sent target message is later than a generation time of any log in the former sent target message, and M and N each is an integer greater than or equal to 2. It may be understood that, when a plurality of slots are used to asynchronously send the target messages, when one slot completes sending the target message but is still waiting for the node to feed back a processing result of the target message, another slot can start to send another target message. This is different from the prior art in which the another target message is sent only after the node feeds back the result. Therefore, in this embodiment of the present invention, a time for waiting for the node to feed back the result is fully used, and a time span for sending the target messages is shortened. This improves sending efficiency.

In another optional solution, the first node is a new master compute node that has the write operation capability and the read operation capability in the compute node cluster. It should be noted that the new master compute node that has the write operation capability and the read operation capability usually does not know whether a previous master compute node sends a log, and therefore does not know an LSN of the log that has been received by the node. In this case, the latest master compute node sends the first write operation request to the node, to trigger the node to agree on the received log with the slave storage node and feed back the log to the latest master compute node, so that the latest master compute node knows the LSN of the log that has been received by the node. Subsequently, when the latest master compute node sends a log to the node, a case in which different logs have a same LSN does not occur. This avoids a log collision.

It should be noted that for implementation of the units, refer to corresponding descriptions of the method embodiment shown in FIG. 3. The node in the embodiment shown in FIG. 7 may be the master storage node in the method embodiment shown in FIG. 3.

In the node 70 described in FIG. 7, the first node sends, during initialization, the first write operation request to the node, and then the node agrees on the first write operation after agreeing on the received log with the slave storage node. In this way, when subsequently feeding back the submitted log to the first node, the node does not miss any received log, so that the first node and the node keep consistency on the recorded LSN, and the log collision problem caused by the inconsistent LSNs is avoided.

An embodiment of the present invention further provides a chip system. The chip system includes at least one processor, a memory, and an interface circuit. The memory, the transceiver, and the at least one processor are connected to each other by using a line. The at least one memory stores an instruction, and when the instruction is executed by the processor, the method procedure shown in FIG. 3 is implemented.

An embodiment of the present invention further provides a computer-readable storage medium. The computer-readable storage medium stores a program instruction, and when the program instruction is run on a processor, the method procedure shown in FIG. 3 is implemented.

An embodiment of the present invention further provides a computer program product. When the computer program product runs on a processor, the method procedure shown in FIG. 3 is implemented.

By implementing the embodiments of the present invention, the first node sends, during initialization, the first write operation request to the master storage node, and then the master storage node agrees on the first write operation after agreeing on the received log with the slave storage node. In this way, when subsequently feeding back the submitted log to the first node, the master storage node does not miss any received log, so that the first node and the master storage node keep consistency on the recorded LSN, and the log collision problem caused by the inconsistent LSNs is avoided.

A person of ordinary skill in the art may understand that all or some of the procedures of the method in the embodiments may be implemented by a computer program instructing related hardware. The program may be stored in a computer readable storage medium. When the program is executed, the procedure of the foregoing method embodiment may be included. The foregoing storage medium includes any medium that can store program code, such as a ROM or a random access memory RAM, a magnetic disk, or an optical disc.

What is claimed is:

1. A method, comprising:
   obtaining, by a first node during initialization, a status message of a storage node cluster, the status message marking a master storage node of the storage node cluster, the first node being a master compute node in a compute node cluster and having write operation capability and read operation capability;

sending, by the first node, a first write operation request to the master storage node based on the status message, so that the master storage node agrees on a first write operation after agreeing on a received log with a slave storage node in the storage node cluster; and receiving, by the first node, a feedback message that is sent after the master storage node agrees on the first write operation with the slave storage node in the storage node cluster, wherein the feedback message comprises identification information and a response to the first write operation request, and the identification information indicates the agreed log; and sending, by the first node, a target message to the master storage node, wherein the target message comprises a current iteration identifier, the master storage node being configured to use the current iteration identifier to determine whether the target message is from a latest master compute node, the current iteration identifier is greater than a previous iteration identifier sent by a previous master compute node.

2. The method according to claim 1, further comprising:
sending, by the first node, a first request to a preset configuration manager to request the current iteration identifier, wherein the configuration manager is a preconfigured node configured to maintain information required by the master compute node and information required by the master storage node; and receiving, by the first node, the current iteration identifier sent by the configuration manager.

3. The method according to claim 1, further comprising:
sending, by the first node, a first request to a preset configuration manager to request the previous iteration identifier, wherein the configuration manager is a preconfigured node configured to maintain information required by the master compute node and information required by the master storage node;

receiving, by the first node, the previous iteration identifier sent by the configuration manager; and generating, by the first node, the current iteration identifier based on the previous iteration identifier.

4. The method according to claim 1, wherein the target message comprises at least one log; and
the sending, by the first node, the target message to the master storage node comprises:
asynchronously sending, by the first node, M target messages to the master storage node by using N slots, wherein each slot in the N slots is used to send one target message each time, and a target message comprising a log with an earlier generation time is sent earlier; and in any two target messages that are sent close to each other, a latter target message is sent only after a former sent target message is received by the master storage node, a generation time of any log in the latter sent target message is later than a generation time of any log in the former sent target message, and M and N each is an integer greater than or equal to 2.

5. The method according to claim 1, wherein the obtaining, by the first node during initialization, the status message of a storage node cluster comprises:
obtaining, by the first node during initialization, the status message of the storage node cluster from a configuration manager, wherein the configuration manager is the preconfigured node configured to maintain the information required by the master compute node and the information required by the master storage node.

6. The method according to claim 1, wherein the first node is a new master compute node that has the write operation capability and the read operation capability in the compute node cluster.

7. The method according to claim 1, wherein the first write operation comprises a no-operation noop.

8. A method comprising:
receiving, by a master storage node, a first write operation request sent by a first node, the first node being a master compute node in a compute node cluster, the master compute node having a write operation capability and a read operation capability;

agreeing, by the master storage node based on the first write operation request, on a first write operation after agreeing on a received log with a slave storage node in a storage node cluster in which the master storage node is located;

sending, by the master storage node to the first node, identification information and a response to the first write operation request after agreeing on the first write operation with the slave storage node, wherein the identification information indicates the agreed log;

receiving, by the master storage node, a target message comprising a current iteration identifier and at least one log; and if the current iteration identifier is smaller than an iteration identifier stored in the master storage node, discarding, by the master storage node, the log in the currently received target message, wherein the iteration identifier stored in the master storage node is a previous iteration identifier received by the master storage node.

9. The method according to claim 8, further comprising:
if the current iteration identifier is not smaller than the iteration identifier stored in the master storage node, synchronizing, by the master storage node, the log in the currently received target message to the storage node cluster in which the master storage node is located, and replacing the iteration identifier stored in the master storage node with the current iteration identifier.

10. The method according to claim 8, wherein the receiving, by the master storage node, the target message comprises:
receiving, by the master storage node, N target messages that are asynchronously sent by the first node by using N slots, wherein each slot in the N slots is used to send one target message each time, and a target message comprising a log with an earlier generation time is sent earlier; and in any two target messages that are sent close to each other, a latter target message is sent only after a former sent target message is received by the master storage node, a generation time of any log in the latter sent target message is later than a generation time of any log in the former sent target message, and M and N each is an integer greater than or equal to 2.

11. The method according to claim 8, wherein the first node is a new master compute node that has the write operation capability and the read operation capability in the compute node cluster.

12. The method according to claim 8, wherein the first write operation comprises a no-operation noop.

13. A system, comprising:
a master compute node;
at least one slave compute node;
a master storage node, and
at least one slave storage node;
wherein:

the master compute node is configured to send a read operation request and/or a write operation request to the master storage node, and is configured to send a read operation request to the slave storage node;

the slave compute node is configured to send a read operation request to the master storage node and/or the slave storage node;

the master storage node is configured to: perform a write operation based on the received write operation request and agree on the performed write operation with the at least one slave storage node; and is configured to perform a read operation based on the received read operation request;

the slave storage node is configured to: agree with the master storage node on the write operation performed by the master storage node and is configured to perform a read operation based on the received read operation request;

the master compute node is further configured to send a first write operation request to the master storage node;

the master storage node is configured to: receive the first write operation request, agree on a first write operation based on the first write operation request after agreeing on a received log with the at least one slave storage node, and send, to the master compute node, identification information and a response to the first write operation request after agreeing on the first write operation with the at least one slave storage node, wherein the identification information is used to indicate the agreed log between the master storage node and the at least one slave storage node;

receive, from the master storage node, the identification information and the response; and send a target message to the master storage node, wherein the target message comprises a current iteration identifier, and the current iteration identifier is used by the master storage node to determine whether the target message is from a latest master compute node; and the current iteration identifier is greater than a previous iteration identifier sent by a previous master compute node.

14. The system according to claim 13, wherein the target message comprises at least one log; and the master compute node sends the target message to the master storage node by using the communications interface to:

asynchronously send M target messages to the master storage node by using N slots, wherein each slot in the N slots is used to send one target message each time, and a target message comprising a log with an earlier generation time is sent earlier; and in any two target messages that are sent close to each other, a latter target message is sent only after a former sent target message is received by the master storage node, a generation time of any log in the latter sent target message is later than a generation time of any log in the former sent target message, and M and N each is an integer greater than or equal to 2.

15. The system according to claim 13, wherein the master storage node is further configured to:

receive a target message, wherein the target message comprises a current iteration identifier and at least one log; and if the current iteration identifier is smaller than an iteration identifier stored in the node, discard the log in the currently received target message, wherein the iteration identifier stored in the node is a previous iteration identifier received by the node.

16. The node according to claim 15, wherein the receiving, by the master storage node, the target message by using the communications interface comprises:

receiving M target messages that are asynchronously sent by the first node by using N slots, wherein each slot in the N slots is used to send one target message each time, and a target message comprising a log with an earlier generation time is sent earlier; and in any two target messages that are sent close to each other, a latter target message is sent only after a former sent target message is received by the node, a generation time of any log in the latter sent target message is later than a generation time of any log in the former sent target message, and M and N each is an integer greater than or equal to 2.

17. The node according to claim 13, wherein the first write operation comprises a no-operation noop.

* * * * *